United States Patent [19]
Gera et al.

[11] Patent Number: 5,662,371
[45] Date of Patent: Sep. 2, 1997

[54] SUN VISOR GLARE REDUCER EXTENSION

[76] Inventors: Sanjay Gera, 9068 B Town & Country Blvd.; Alexander Bederak, 8749-E Town & Country Blvd., both of Ellicott City, Md. 21043

[21] Appl. No.: 636,222

[22] Filed: Apr. 23, 1996

[51] Int. Cl.⁶ .................................................. B60J 3/02
[52] U.S. Cl. .................. 296/97.8; 312/332; 312/334.1; 52/223.14
[58] Field of Search .................... 296/97.8, 97.1, 296/97.6, 97.9, 97.11; 312/332, 334.1, 334.4; 52/223.14

[56] References Cited

U.S. PATENT DOCUMENTS

| | | | |
|---|---|---|---|
| D. 351,578 | 10/1994 | Whitt | D12/191 |
| 3,336,072 | 8/1967 | Leonard | 296/97.8 |
| 3,961,820 | 6/1976 | Spangler | 296/97 E |
| 3,988,033 | 10/1976 | Vacha | 296/97 E |
| 4,828,314 | 5/1989 | Gavagan | 296/97.8 |
| 4,982,992 | 1/1991 | Vu et al. | 296/97.6 |
| 5,031,952 | 7/1991 | Miyamoto et al. | 296/97.11 |
| 5,040,840 | 8/1991 | Kokeisi | 296/97.6 |
| 5,067,764 | 11/1991 | Lanser et al. | 296/97.8 |
| 5,213,389 | 5/1993 | Loftis et al. | 296/97.7 |
| 5,466,029 | 11/1995 | Zetterlund | 296/97.8 |

FOREIGN PATENT DOCUMENTS 3-239629  10/1991  Japan ..................... 296/97.8

*Primary Examiner*—David M. Mitchell
*Assistant Examiner*—Hoa B. Trinh
*Attorney, Agent, or Firm*—John Gugliotta; David L. Volk

[57] ABSTRACT

A sun visor glare reducing extension for incorporation within a vehicle's sun visor is disclosed having a three sided rigid frame capable of being incorporated within a vehicle's sun visor. The frame has a back frame member pivotally affixed to a pair of generally parallel leg segments at each end. Each leg segment forms a "U" shaped retaining channel. A glare shield slidably retained within the "U" shaped retaining channels, and is deployable in a linear manner from the edge of an otherwise conventional sun visor.

5 Claims, 2 Drawing Sheets

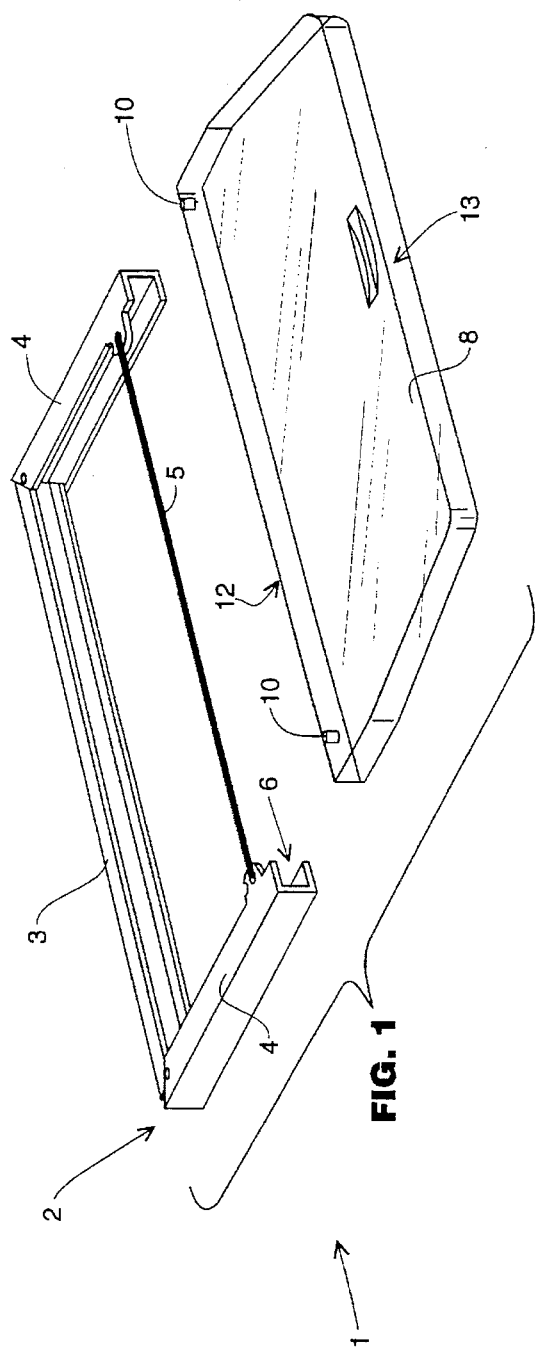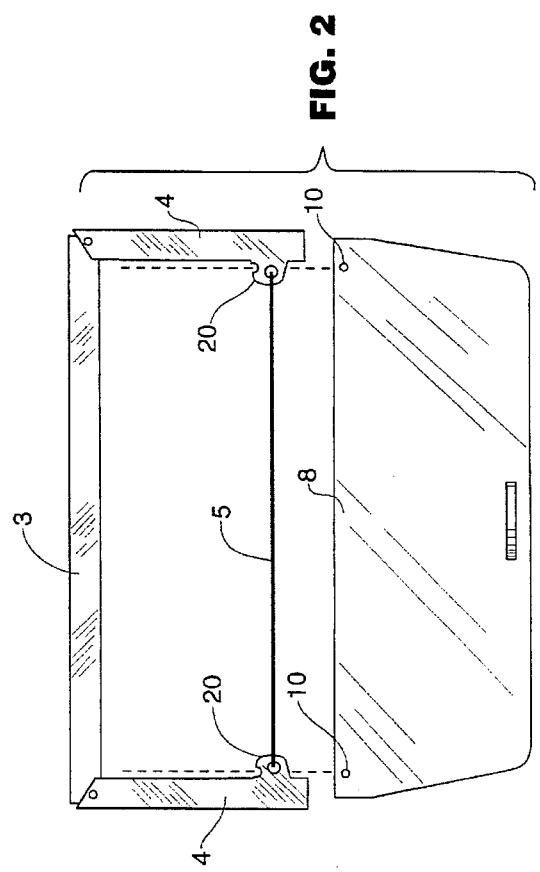

SUN VISOR GLARE REDUCER EXTENSION

BACKGROUND OF THE INVENTION

1. Field of the Invention

The present invention relates to visor glare shields and, particular, to a visor glare shield that is deployable and returnable in a linearly slidable fashion.

2. Description of the Related Art

In the related art there are many variations and adaptations of a sun visor glare shield. For example, in U.S. Pat. No. 4,982,992, issued in the name of Vu et al., a clip on flat sun visor is disclosed which can be easily clipped onto the conventional sun visor used in a motor vehicle. Another example is given in U.S. Pat. No. 3,988,033, issued in the name of Vacha. The glare shield disclosed in the Vacha reference performs a similar functionality, albeit in a modified configuration. Further, in U.S. Patent Des. 351,578, issued in the name of Whitt, an add on sun visor is disclosed which can be easily clipped to a vehicle sun visor. Further still, a vehicle sun visor is disclosed in U.S. Pat. No. 5,213,389, issued in the name of Loftis et al., wherein a number of storage compartments are also included, none of these said references however, has the ability to linearly protrude in an adjustable manner a glare reducing shield as disclosed.

Finally, in U.S. Pat. No. 3,961,820 issued in the name of Spangler, an adjustable sun shield is disclosed wherein a screen sun shield is adapted to be extended from an automobile sun visor in a plurality of horizontally linear directions, thereby partially resulting in a desirable effect of having a linearly deployable sun shield. However, such a sun glare shield is difficult to deploy and even more difficult to adjust while operating a motor vehicle. Consequently, a need has long been felt for a device for reducing the high beam glare from oncoming vehicles in a manner that is easily deployable, easily adjustable in a linear fashion and easily returned out of the way.

SUMMARY OF THE INVENTION

It is therefore an object of the present invention to provide an improved vehicle anti-glare shield.

It is yet another object of the present invention to provide an improved high beam glare reducer.

It is yet another object of the present invention to provide an improved glare reducing or high beam glare reducer that can be easily adapted to fit within a standard sun visor of a vehicle.

It is yet another object of the present invention to provide such a device which can be deployed in a linearly adjustable manner.

Briefly described according to the preferred embodiment of the present invention, a glare reducer is disclosed having a three sided rigid frame comprising a back frame member of an elongated nature having on each end a pivoted leg segment. The pivoted leg segment extends laterally outward from the back frame in a generally parallel manner and is communicated together via an elastic member. Each leg segment forms a retaining channel. Within the retaining channel is held a plastic glare shield formed of a clear amber colored piece of plexiglass or safety glass. The glare shield is held in place within the channels of two legs by the elastic member. The glare shield is formed in a trapezoidal shape with the long base leaning up against the back frame and the shorter base extending outward within the leg channels. The leg channels are fixable within the sun visor of a standard motor vehicle, and in such a configuration the plastic glare panel can be dispensed from the frame member via linear sliding along the leg channels. The glare panel can be returned in a similar manner.

An advantage of the present invention is that it can be utilized to help eliminate the glare resulting from oncoming high beams at night.

Another advantage of the present invention is that it cam be easily fixed to any standard sun visor of a motor vehicle.

Further, the present can be easily adjusted to provide such glare reduction benefits from oncoming traffic without interfering with the user's sight, head position or visor position.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 1 is an exploded perspective view of a sun visor glare reducing extension according to the preferred embodiment of the present invention;

FIG. 2 is an exploded front elevational view thereof; and

DESCRIPTION OF THE PREFERRED EMBODIMENTS

1. Detailed Description of the Figures

Figure 3:
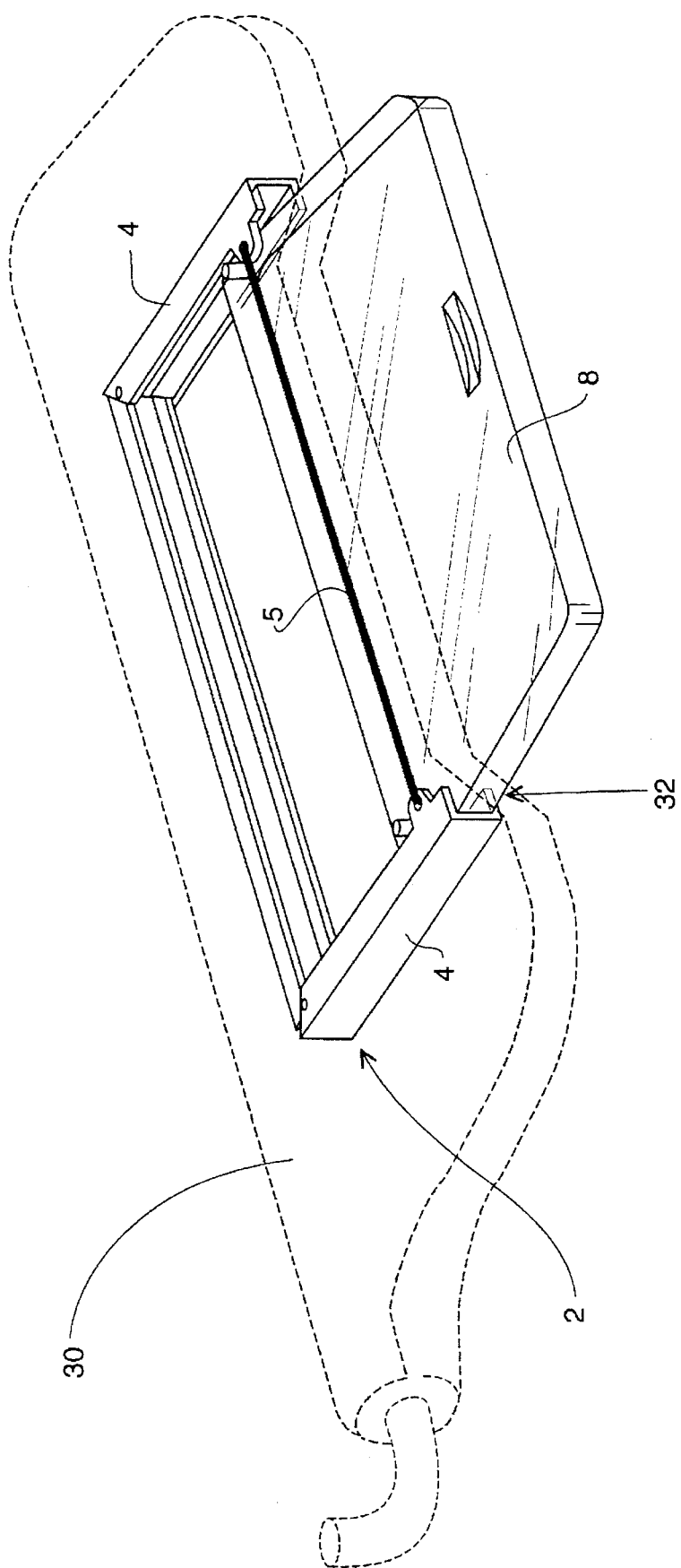
FIG. 3 is a perspective view depicting the device installed within the sun visor of a motor vehicle.

Referring now to FIG. 1, a sun visor glare reducing extension 1 is shown, according to the present invention, for installation within a standard type opaque automobile sun visor. A three sided rigid frame 2 is utilized comprising a back frame member 3 of an elongated nature having on each end a pivoted leg segment 4. The pivoted leg segments 4 extends laterally outward from the back frame member 3 in a generally parallel manner to each other, and are communicated together via an elastic urging member 5. Each leg segment 4 forms a "U" shaped retaining channel 6 such that within the retaining channel 6 is held a plastic glare shield 8 formed of a clear amber colored piece of plexiglass or safety glass. The glare shield 8 has a pair of guide stops 10 protruding slightly upward from its surface. The glare shield 8 is formed in a trapezoidal shape with a long base 12 aligned parallel to the back frame 3 and a shorter base 13 disposed parallel to the long base 12.

As better shown in FIG. 2, each leg member 4 has a stopping tab 20 extending inward. This stopping tab 20 is utilized as an attachment point for the elastic member 5. Also, the stopping tabs 20 act as a stopping means during discharge of the glare shield 8 by forming a barrier when impinged against the guide stops 10.

2. Operation of the Preferred Embodiment

In accordance with a preferred embodiment of the present invention, as shown in FIG. 3, it is envisioned that the guide frame 2 will be fixable within any generally available, opaque type sun visor 30 that are presently provided within motor vehicles. With a discharge slot 32 being formed along the edge of the sun visor, in such a configuration the plastic glare panel 8 can be dispensed from the frame member 2 via linear sliding along the leg channels 4. The glare panel can be returned in a similar manner. The long base 12 becomes aligned against the back frame member 3 when the glare shield 8 is in a fully retracted position. The tension caused by the leg channels 4 being urged against the sides of the glare panel 8 by the urging of the elastic member 5 will maintain the position of the glare panel 8.

The foregoing description is included to illustrate the operation of the preferred embodiment and is not meant to limit the scope of the invention. It is envisioned that one ordinarily skilled in the art would be capable of many modifications and changes to the preferred embodiment that are well within the present teaching. For example, a plurality of glare shields can be incorporated independently within said frame 2 in order to provide varying levels of glare reduction. Similar results can be achieved by utilizing various colors for the glare shield. And further, such a system can be easily adapted for installation with the windows of airplanes, mobile homes, or helicopters. Therefore, the scope of the invention is to be limited only by the following claims.

What is claimed is:

1. A sun visor glare reducing extension for incorporation within a vehicle's sun visor, said sun visor glare reducing extension comprising:

a three sided rigid frame capable of being incorporated within a vehicle's sun visor, said rigid frame having a back frame member of an elongated nature pivotally affixed to a pair of generally parallel leg segments at each end, and wherein further each leg segment forms a U-shaped retaining channel;

a elastic urging member affixed to each leg segment for providing an force tending to urge both said leg segments toward each other; and a glare shield slidably retained within said U-shaped retaining channels, said glare shield having a pair of guide stops protruding slightly upward from its surface, said glare shield formed in a generally trapezoidal shape with the long base aligned parallel with said back frame.

2. The sun visor glare reducing extension as described in claim 1, wherein each said leg member has a stopping tab extending inward for providing an impinging stopping impediment when contacting said guide stops, and wherein said stopping tab is further utilized as an attachment point for said elastic member.

3. The sun visor glare reducing extension as described in claim 1, wherein said glare shield is formed of a clear amber colored piece of plexiglass.

4. A sun visor for an automobile comprising:

a sun visor having an upper surface, a lower surface, and an edge; and a glare reducing extension for incorporation within said sun visor for discharging a glare reducing shield outward from said edge of said sun visor;

said extension comprising an elongated back frame member having a pair of ends;

said extension further comprising a pair of leg segments, one each of said leg segments pivotally attached to each said end of said back frame member;

each leg segment forming a u-shaped retaining channel having a stopping tab extending inward;

an elastic urging member attached to each said stopping tab for providing a force tending to urge said leg segments toward each other; and a glare shield slidably retained within said u-shaped retaining channels, said glare shield formed in a generally trapezoidal shape with the long base aligned parallel with said back frame.

5. The sun visor of claim 4, wherein said glare shield is formed of a clear amber colored piece of plexiglass.

* * * * *